US008865818B2

(12) United States Patent
Burgard et al.

(10) Patent No.: US 8,865,818 B2
(45) Date of Patent: Oct. 21, 2014

(54) ADDITIVE FOR IMPROVING THE SOLVENT RESISTANCE AND OTHER PROPERTIES OF WATER-BASED BINDER SYSTEMS

(75) Inventors: Detlef Burgard, Voelklingen (DE); Klaus Steingroever, Saarbruecken (DE); Marc Herold, Saarbruecken (DE)

(73) Assignee: Buehler Partec GmbH, Saarbruecken (DE)

(*) Notice: Subject to any disclaimer, the term of this patent is extended or adjusted under 35 U.S.C. 154(b) by 288 days.

(21) Appl. No.: 13/145,002

(22) PCT Filed: Feb. 2, 2010

(86) PCT No.: PCT/EP2010/051246
§ 371 (c)(1),
(2), (4) Date: Sep. 21, 2011

(87) PCT Pub. No.: WO2010/089293
PCT Pub. Date: Aug. 12, 2010

(65) Prior Publication Data
US 2012/0004355 A1 Jan. 5, 2012

(30) Foreign Application Priority Data
Feb. 3, 2009 (EP) ..................................... 09151977

(51) Int. Cl.
*C08K 3/22* (2006.01)
*C09D 1/00* (2006.01)
*C09J 11/04* (2006.01)
*C09D 7/12* (2006.01)
*C09D 5/02* (2006.01)
*C09D 5/34* (2006.01)

(52) U.S. Cl.
CPC ................ *C09D 5/024* (2013.01); *C09J 11/04* (2013.01); *C08K 3/22* (2013.01); *C09D 7/1216* (2013.01); *C09D 5/34* (2013.01)
USPC .......................................... 524/432; 106/425

(58) Field of Classification Search
USPC .......................................... 524/432; 106/425
See application file for complete search history.

(56) References Cited

U.S. PATENT DOCUMENTS

| | | | |
|---|---|---|---|
| 4,121,985 A | 10/1978 | Cherenko | |
| 6,342,556 B1 | 1/2002 | Batdorf et al. | |
| 7,148,277 B2 * | 12/2006 | Grabowski et al. | 524/273 |
| 7,399,487 B2 * | 7/2008 | Batz-Sohn et al. | 424/489 |
| 7,438,836 B2 | 10/2008 | Michael et al. | |
| 7,482,054 B2 | 1/2009 | Tarng et al. | |
| 7,642,309 B2 | 1/2010 | Tarng et al. | |
| 7,727,323 B2 | 6/2010 | Tarng et al. | |
| 7,754,801 B2 * | 7/2010 | Sheerin et al. | 524/432 |
| 7,767,737 B2 * | 8/2010 | Musch et al. | 523/334 |
| 7,901,502 B2 * | 3/2011 | Barthel et al. | 106/287.34 |
| 8,137,659 B2 * | 3/2012 | Kessell | 424/59 |
| 8,383,087 B2 * | 2/2013 | Schlossman et al. | 424/59 |
| 2003/0180466 A1 | 9/2003 | Rohrbaugh et al. | |
| 2003/0228271 A1 * | 12/2003 | Batz-Sohn et al. | 424/70.23 |
| 2005/0169861 A1 * | 8/2005 | Lortz et al. | 424/63 |
| 2005/0182174 A1 | 8/2005 | Michael et al. | |
| 2006/0027141 A1 | 2/2006 | Tarng et al. | |
| 2006/0030656 A1 | 2/2006 | Tarng et al. | |
| 2006/0069196 A1 | 3/2006 | Grabowski et al. | |
| 2006/0134339 A1 * | 6/2006 | Wang et al. | 427/407.1 |
| 2008/0214718 A1 * | 9/2008 | DiStefano et al. | 524/432 |
| 2008/0255273 A1 | 10/2008 | Pepe et al. | |
| 2009/0107362 A1 | 4/2009 | Tarng et al. | |
| 2010/0137495 A1 | 6/2010 | Tarng et al. | |
| 2010/0218702 A1 | 9/2010 | Tarng et al. | |

FOREIGN PATENT DOCUMENTS

| | | | |
|---|---|---|---|
| JP | 57-123271 A | | 7/1982 |
| JP | 62-28496 A | | 2/1987 |
| JP | 2007254245 A | * | 10/2007 |
| WO | 95/09208 A1 | | 4/1995 |
| WO | 03/040223 A2 | | 5/2003 |
| WO | 2004/106422 A1 | | 12/2004 |
| WO | 2005/071029 A2 | | 8/2005 |
| WO | 2005/119359 A2 | | 12/2005 |
| WO | 2008/049679 A1 | | 5/2008 |

OTHER PUBLICATIONS

JP 2007254245 A, Oct. 2007, Machine translation.*

* cited by examiner

*Primary Examiner* — Satya Sastri
(74) *Attorney, Agent, or Firm* — Abel Law Group, LLP

(57) ABSTRACT

Aqueous dispersions which comprise nanoscale ZnO particles and nanoscale particles of a non-ZnO metal oxide, semimetal oxide or oxo salt are used in aqueous binder systems, such as coating materials, adhesives, sealants and binders, to improve the solvent resistance of the dried or cured binder system, and to improve other properties.

20 Claims, No Drawings

ADDITIVE FOR IMPROVING THE SOLVENT RESISTANCE AND OTHER PROPERTIES OF WATER-BASED BINDER SYSTEMS

BACKGROUND OF THE INVENTION

1. Field of the Invention

The invention relates to the use of an additive containing zinc oxide for improving the solvent resistance or other properties, such as resistance or drying behavior, of water-based binder systems, to the additive, and to an aqueous coating material comprising the additive.

2. Discussion of Background Information

Zinc oxide is already used for various purposes in water-based coating materials. Its use as a white pigment is well known. In wood coatings, ZnO is used, besides other zinc salts, as an additive for preventing the bleeding of tannic acid. Zinc oxide is also used in primers on metals, as an adhesion promoter. For these applications, zinc oxide particles with a diameter of more than 1 μm are employed.

Zinc oxide and other metal oxides are also used in coating materials in order to improve UV protection, solvent resistance, and surface hardness. WO 2008/049679 describes the use of nanoparticles for coating materials on an organic solvent basis, in order to achieve an improvement in scratch resistance and in flexibility. U.S. Pat. No. 6,342,556 describes the use of ZnO particles having a diameter of 10 to 80 nm in water in combination with coating materials for improved UV protection of wood.

WO 2005/071002 relates to the use of a dispersion comprising ZnO having a BET surface area of 10 to 200 m$^2$/g as transparent UV protection in coating materials. The ZnO particles described in that application are pyrogenically prepared particles which in dispersion have an average secondary particle size of less than 300 nm. Although these pyrogenically produced particles do possess a specific surface area in the order of magnitude of nanoparticulate zinc oxide, they cannot be used to produce transparent coats. The additive specified in WO 2005/071002 is therefore unsuitable for use in transparent coating systems.

WO 2005/071029 uses zinc oxide having a particle diameter of less than 100 nm in order to improve the surface hardness and the scratch resistance of polyurethane (PUR) coating materials. WO 2006/023064 relates to the use of ZnO dispersions in PUR binders for producing scratch-resistant floor coatings. WO 2006/023064 describes the production of scratch-resistant wood-preservative coating materials through the use of ZnO dispersions in acrylic binders. A mixture of Al$_2$O$_3$ microparticles and nanoparticles is used in PU resins and melamine/formaldehyde resins for improving the surface hardness (WO 03/040223).

WO 2006/023064 describes the use of 2 to 20% nanoscale zinc oxide in acrylate-containing coating materials and coatings, in order to improve the adhesion, tannin resistance or corrosion resistance, for example. Since the fraction of the relatively expensive ZnO is more than 2%, the composition is economically irrelevant for the top coat sector. WO 2006/023065 relates to coating compositions which comprise microscale TiO$_2$ pigments and nanoscale metal oxide such as ZnO, the intention being that the nanoscale metal oxide should ensure a uniform spacing of the TiO$_2$ pigments in the coat.

WO 2005/119359 and US-A1-2003/0180466 describe film-forming compositions which comprise binder, nanoparticle, surfactant, and a polymeric dispersant, in order to improve the abrasion resistance of substrates coated with such compositions.

One of the means employed for increasing the solvent resistance of coatings is their subsequent crosslinking with UV initiators, as shown in U.S. Pat. No. 4,121,985, for example. In accordance with JP-A-62-28496, solvent-resistant coats are produced by the use of acidically/basically crosslinking binder constituents. In addition to the use of UV initiators, functional silanes as well are employed for the postcrosslinking of polymer coats, as described in DE-T2-69426674, for example. JP-A-11012426 describes resin compositions comprising carboxylated acrylic resin and inorganic particles with oxazoline groups on the surface, in order to obtain coatings having good solvent resistance.

WO 2008/064114 relates to the use of ZnO particles having a diameter of less than 1 μm in an acrylate hybrid coating material for the purpose of improving the solvent resistance, the moisture resistance, and the UV resistance. JP-A-57123271 relates to clearcoat compositions, such as acrylic varnishes, to which SnO$_2$ powder or In$_2$O$_3$ powder with a diameter<100 nm is added, for purposes including that of improving the solvent resistance. On account of the costs of the powders employed, especially of the In$_2$O$_3$ powder, this approach does not have much economic interest.

A UV post-crosslinking for improving the solvent resistance necessitates an additional operating step. Moreover, chemical postcrosslinking results in the embrittlement of the coating film. This places limits on its use, particularly for applications where high elasticity is needed.

There is therefore a demand for additives for binder systems, more particularly coating systems, with which the solvent resistance of water-containing binder systems can be significantly improved without detracting from the overall profile of the binder system through the addition of large quantities. In this context, even quantities of less than 2% by weight ought, when added, to achieve a significant effect, in order to allow a reduction in production costs and to have as little detrimental effect as possible on the other properties of the binder system, particularly of a coating material.

Surprisingly it has been found that the combination of at least two inorganic nanoparticle dispersions results in a synergistic boost to the solvent resistance of the dried or cured binder system. The particle mixtures are mixtures of zinc oxide with at least one other metal oxide, semimetal oxide or oxo salt.

SUMMARY OF THE INVENTION

The present invention provides a method of increasing the solvent resistance of a dried or cured aqueous binder system. The method comprises combining the aqueous binder system with (i) an aqueous dispersion comprising nanoscale ZnO particles and nanoscale particles of at least one non-ZnO metal oxide, semimetal oxide or oxo salt, or (ii) a kit comprising at least two aqueous dispersions, a first aqueous dispersion comprising nanoscale ZnO particles and one or more further aqueous dispersions comprising nanoscale particles of at least one non-ZnO metal oxide, semimetal oxide or oxo salt.

In one aspect of the method, the aqueous binder system may be an aqueous coating material, an aqueous adhesive, an aqueous sealant, or an aqueous binder.

In another aspect, the nanoscale particles of the at least one non-ZnO metal oxide, semimetal oxide or oxo salt may comprise one or more of SiO$_2$, aluminum oxide, titanium dioxide, zirconium dioxide, cerium dioxide, yttrium oxide, mixed oxides of aluminum oxide and silicon dioxide, aluminosilicate, iron oxide, and core-shell particles with a shell of SiO$_2$, barium sulfate or calcium carbonate.

In yet another aspect, the aqueous dispersion or further aqueous dispersion of the kit (ii) may comprise at least two different nanoscale particles of a non-ZnO metal oxide, semimetal oxide or oxo salt.

In a still further aspect, the kit (ii) may comprise at least two further aqueous dispersions. For example, one of the at least two further aqueous dispersions may comprise nanoscale SiO$_2$ particles and another one of the dispersions may comprise nanoscale particles of one or more of aluminum oxide and iron oxide.

In another aspect of the method, the nanoscale particles of the at least one non-ZnO metal oxide, semimetal oxide or oxo salt may comprise hydrophobic particles. For example, the hydrophobic particles may comprise one or more of hydrophobic $SiO_2$ and hydrophobic $Al_2O_3$.

In a still further aspect, the aqueous dispersion or at least one of the aqueous dispersions of kit (ii) may comprise at least one dispersant.

In another aspect, the fraction of the nanoscale particles of a non-ZnO metal oxide, semimetal oxide or oxo salt, relative to the total weight of nanoscale ZnO particles and nanoscale particles of a non-ZnO metal oxide, semimetal oxide or oxo salt, may be from 0.1% to 50% by weight.

In another aspect of the method of the present invention, (i) or (ii) may be employed in an amount to result in a combined mass fraction of the nanoscale ZnO particles and the nanoscale particles of at least one non-ZnO metal oxide, semimetal oxide or oxo salt in the dried or cured binder system of from 0.01% to 20% by weight, e.g., from 0.1% to 5% by weight.

The present invention also provides an aqueous dispersion or a kit comprising at least two aqueous dispersions for improving the resistance and the drying properties of an aqueous binder system. The aqueous dispersion comprises nanoscale ZnO particles and nanoscale particles of at least one non-ZnO metal oxide, semimetal oxide or oxo salt. The kit comprises at least two aqueous dispersions comprising a first aqueous dispersion which comprises nanoscale ZnO particles and one or more further aqueous dispersions which comprise nanoscale particles of at least one non-ZnO metal oxide, semimetal oxide or oxo salt.

The present invention also provides an aqueous binder system that comprises an organic or inorganic binder and an aqueous dispersion which comprises nanoscale ZnO particles and nanoscale particles of at least one non-ZnO metal oxide, semimetal oxide or oxo salt.

In one aspect, the aqueous binder system may be an aqueous coating material, an aqueous adhesive, a sealant, or an aqueous binder.

In another aspect, the binder may be a physically curing, chemically curing or radiation-curing binder.

In yet another aspect of the binder, the nanoscale particles of the at least one non-ZnO metal oxide, semimetal oxide or oxo salt may comprise one or more of $SiO_2$, aluminum oxide, titanium dioxide, zirconium dioxide, cerium dioxide, yttrium oxide, mixed oxides of aluminum oxide and silicon dioxide, aluminosilicate, iron oxide, and core-shell particles with a shell of $SiO_2$, barium sulfate or calcium carbonate. For example, the nanoscale particles of the at least one non-ZnO metal oxide, semimetal oxide or oxo salt may comprise nanoscale $SiO_2$ particles, and may further comprise nanoscale particles of at least one of aluminum oxide and iron oxide.

In a still further aspect of the binder system, the nanoscale particles of the at least one non-ZnO metal oxide, semimetal oxide or oxo salt may comprise hydrophobic particles.

DETAILED DESCRIPTION OF THE INVENTION

The present invention accordingly relates to the use of an aqueous dispersion comprising nanoscale ZnO particles and nanoscale particles of a non-ZnO metal oxide, semimetal oxide or oxo salt, or of a kit comprising at least two aqueous dispersions, with a first aqueous dispersion comprising nanoscale ZnO particles and one or more further aqueous dispersions comprising nanoscale particles of a non-ZnO metal oxide, semimetal oxide or oxo salt, in an aqueous binder system for improving the solvent resistance of the dried or cured binder system.

The addition of the stated aqueous dispersion to the aqueous binder system produces a surprisingly sharp improvement in the solvent resistance of the cured binder system, in the case, for example, of a coating material applied to a substrate and dried and/or cured, in comparison to coating materials in which only one kind of nanoscale particles is added. It has been found that further properties, such as the drying properties, for example, of the binder system were improved by adding the aqueous dispersion or the kit of aqueous dispersions. The invention is elucidated comprehensively below.

The improvement in the solvent resistance and/or in another resistance through use of an aqueous dispersion comprising nanoscale ZnO particles and nanoscale particles of a non-ZnO metal oxide, semimetal oxide or oxo salt, or of a kit comprising at least two aqueous dispersions, with a first aqueous dispersion comprising nanoscale ZnO particles and one or more further aqueous dispersions comprising nanoscale particles of a non-ZnO metal oxide, semimetal oxide or oxo salt, in aqueous binder systems relates to the solvent resistance and/or other resistance of the dried or cured binder system which is obtained from the aqueous binder system.

In the context of the use in accordance with the invention, an aqueous dispersion comprising nanoscale ZnO particles and nanoscale particles of a non-ZnO metal oxide, semimetal oxide or oxo salt, or a kit comprising at least two aqueous dispersions, with a first aqueous dispersion comprising nanoscale ZnO particles and one or more further aqueous dispersions comprising nanoscale particles of a non-ZnO metal oxide, semimetal oxide or oxo salt, is added to the aqueous binder system, the aqueous binder system is applied to a substrate, and then the binder system is dried and/or cured. The nature of the drying or curing is guided by the binder system, and is carried out in a manner with which the skilled person is familiar, as for example by evaporating, heating and/or irradiating. The drying or curing may comprise physical drying and/or chemical curing or crosslinking.

The additive which is used in an aqueous binder for improving the solvent resistance of the dried or cured binder system is an aqueous dispersion comprising nanoscale ZnO particles and nanoscale particles of a non-ZnO metal oxide, semimetal oxide or oxo salt, or a kit comprising at least two aqueous dispersions, with a first aqueous dispersion comprising nanoscale ZnO particles and with one or more further aqueous dispersions comprising nanoscale particles of a non-ZnO metal oxide, semimetal oxide or oxo salt. The additive is preferably composed of a mixture of at least two nanoparticulate aqueous dispersions.

As nanoscale ZnO particles it is possible to use all that are known to the skilled person. Such nanoscale ZnO particles are available commercially or can readily be prepared by processes known to the skilled person. The ZnO particles may also be hydrophobic nanoscale ZnO particles.

The additive further comprises at least one further kind of nanoscale particles, selected from a non-ZnO metal oxide, semimetal oxide or oxo salt, with preference being given to particles of a metal oxide or semimetal oxide. Metal oxides or semimetal oxides here also include hydrated oxides, hydroxide oxides or hydroxides. Nanoscale particles of metal oxide, semimetal oxide or oxo salt are also known to the skilled worker and in general are available commercially, or they can easily be prepared by processes known to the skilled person.

The nanoscale particles selected from a non-ZnO metal oxide, semimetal oxide or oxo salt may also be core-shell particles, having a core of any desired material and a shell of a non-ZnO metal oxide, semimetal oxide or oxo salt. It is useful if the core as well is composed of a non-ZnO metal oxide, semimetal oxide or oxo salt, in which case the material for the core and the material for the shell are different. The metal oxide or semimetal oxide may also be mixed oxide, i.e., an oxide of two or more metal or semimetals, which also includes hydrated oxides, hydroxide oxides or hydroxides. Mixed oxides comprise, for example, silicates, such as aluminosilicates, for example, and mixed oxides of aluminum and silicon.

The oxo salt is preferably a salt which is insoluble or sparingly soluble in water. Generally speaking it is a metal oxo salt. An oxo salt comprises an oxygen-containing anion, e.g., the anion of an oxo acid. Examples of suitable oxo salts are sulfates, phosphates, and carbonates, e.g., metal sulfates, metal phosphates, and metal carbonates. Examples of useful oxo salts which may be employed in the form of nanoscale particles are $CaCO_3$ and $BaSO_4$.

Specific examples of suitable nanoscale semimetal oxides and metal oxides for the nanoscale particles are $SiO_2$, more particularly precipitated silicas, aluminum oxides, titanium dioxide, zirconium dioxide, cerium dioxide, yttrium oxide, mixed oxides of aluminum oxide and silicon dioxide, aluminosilicates, iron oxides, including iron hydroxide oxides, and core-shell particles which possess a core of any desired metal oxide and a shell of $SiO_2$, in each case including hydrated oxides, hydroxide oxides or hydroxides. Preferred examples of nanoscale particles of a metal oxide or semimetal oxide are particles of $SiO_2$, $Al_2O_3$ or $Fe_2O_3$ or of other iron oxides, with $SiO_2$ being particularly preferred. $SiO_2$ may be used, for example, in the form of colloidal $SiO_2$ or fumed $SiO_2$. Examples of suitable nanoscale $SiO_2$ particles are, for example, commercial silica sols, fumed silicas or precipitated silicas.

The nanoscale particles selected from a non-ZnO metal oxide, semimetal oxide or oxo salt are preferably hydrophobic nanoscale particles. Specific examples of suitable hydrophobic nanoscale metal oxides or semimetal oxides are hydrophobic precipitated silica (e.g., Sipernat® D17), hydrophobic aluminum oxides, hydrophobic titanium dioxide, hydrophobic zirconium dioxide, hydrophobic cerium dioxide, hydrophobic yttrium oxide, hydrophobic mixed oxides of aluminum oxide and silicon dioxide, hydrophobic aluminosilicates, hydrophobic iron oxides, and core-shell particles which possess a core of any desired metal oxide and a shell of $SiO_2$ and have been subsequently hydrophobized by a common process. Preferred examples used are hydrophobic $SiO_2$ and hydrophobic $Al_2O_3$, with particular preference being given to hydrophobic $SiO_2$, more particularly hydrophobic precipitated silica. In the case of the oxo salts as well, hydrophobic nanoscale oxo salts may be used with advantage.

Metal oxide particles, semimetal oxide particles or oxo salt particles are generally hydrophilic in view of oxo groups or hydroxyl groups on the surface. It is known in the art that such hydrophilic particles can be hydrophobized. Suitable processes are known, and hydrophobic particles prepared by hydrophobization are available commercially. For hydrophobization, the particles may be reacted, for example, with surface modifiers which have hydrophobic groups, such as alkyl groups. The surface modifiers then attach to the surface of the particles and, by virtue of their hydrophobic groups, such as the alkyl groups, give the particles hydrophobic properties. Silicas, for example, are hydrophobized in the art by reaction with chlorosilanes, such as dimethyldichlorosilane, or alkylalkoxysilanes.

In one specific embodiment, in addition to the nanoscale ZnO particles, there are at least two, and more particularly just two, kinds of nanoscale particles of a non-ZnO metal oxide, semimetal oxide or oxo salt present in the aqueous dispersion or in the kit, and all the materials identified above are contemplated for these particles. Preference here is given to an aqueous dispersion which comprises nanoscale ZnO particles, nanoscale $SiO_2$ particles, and at least one further kind of nanoscale particles, of iron oxide or aluminum oxide, for example, or to a kit comprising two aqueous dispersions, the first aqueous dispersion comprising nanoscale ZnO particles, and the further aqueous dispersion comprising nanoscale $SiO_2$ particles and at least one further kind of nanoscale particles, of iron oxide or aluminum oxide, for example. In this embodiment as well, with at least two kinds of nanoscale particles of a non-ZnO metal oxide, semimetal oxide or oxo salt, it is preferred for at least one or two of the nanoscale particles used that are of a non-ZnO metal oxide, semimetal oxide or oxo salt to be hydrophobic, e.g., hydrophobic $SiO_2$.

The ZnO particles and the particles of a non-ZnO metal oxide, semimetal oxide or oxo salt that are used in the aqueous dispersion of the mixture or in the kit are nanoscale. By nanoscale particles are meant, as is usual in the art, particles having an average diameter of less than 1 μm. The average particle diameter here is the volume average of the particle diameter. Unless indicated otherwise, the reference is to the $d_{50}$ value. The average particle diameter is determined by a dynamic scattered-light method, using, for example, the nanotrac particle size analyzer instrument from Microtrac Inc., USA.

The average particle diameter, expressed as the $d_{50}$ value, of the ZnO particles and of the particles of a non-ZnO metal oxide, semimetal oxide or oxo salt is therefore below 1 μm. The nanoscale ZnO particles preferably have an average particle diameter, expressed as the $d_{90}$ value, of not more than 200 nm and more preferably not more than 100 nm. The particles of a non-ZnO metal oxide, semimetal oxide or oxo salt preferably have an average particle diameter, expressed as the $d_{50}$ value, of not more than 500 nm.

Nanoscale ZnO particles and/or nanoscale particles of a non-ZnO metal oxide, semimetal oxide or oxo salt with a suitable size may also, for example, be obtained from corresponding particles having a larger particle diameter, in the microscale range, for example, by comminution of larger particles, in a dispersing machine, for example, such as a mill.

The dispersion comprising the nanoscale particles is an aqueous dispersion—that, is the solvent used in the dispersion is predominantly or exclusively water. It is possible for small fractions of organic solvent to be present, e.g., less than 20% by weight, based on the total weight of water and organic solvent in the aqueous dispersion, preferably less than 10% by weight, and more preferably less than 5% by weight. The figures above relating to the solvent in the aqueous dispersion relate in this context not only to the individual aqueous dispersion used, comprising the mixture of the nanoscale particles, also referred to below as aqueous dispersion of the mixture, but also to each of the individual aqueous dispersions of which the kit is composed, also referred to below as aqueous dispersion of the kit.

The aqueous dispersion preferably comprises one or more dispersing assistants or dispersants, whose purpose is to form and/or to stabilize the aqueous dispersion of the nanoscale particles. Examples of dispersants which can be used include customary nonionic, cationic, anionic or amphoteric surfactants. Such dispersants are customary, and the skilled person is able easily to select a useful dispersant in dependence on the particles employed. The above details relating to the dispersant in the aqueous dispersion relate not only to the aqueous dispersion of the mixture but also to each individual aqueous dispersion of the kit.

The proportion of nanoscale ZnO particles and nanoscale particles of a non-ZnO metal oxide, semimetal oxide or oxo salt in the aqueous dispersion may vary within wide ranges. Generally, however, it is useful, based on the total amount of nanoscale ZnO particles and nanoscale particles of a non-ZnO metal oxide, semimetal oxide or oxo salt, for there to be at least 50% by weight of nanoscale ZnO particles. The proportion of nanoscale particles of a non-ZnO metal oxide, semimetal oxide or oxo salt is usefully in the range from 0.1% to 50%, preferably 0.5% to 20%, and more preferably 2% to 15%, by weight, based on the total amount of nanoscale ZnO particles and nanoscale particles of a non-ZnO metal oxide, semimetal oxide or oxo salt. The above figures relating to the proportion relate to the aqueous dispersion of the mixture. If a kit of at least two aqueous dispersions is used, the aqueous dispersions are suitably each added to the aqueous binder system in amounts such that, overall, nanoscale ZnO particles and nanoscale particles of a non-ZnO metal oxide, semimetal oxide or oxo salt are added in the proportions indicated above.

The amount of nanoscale ZnO particles and nanoscale particles of a non-ZnO metal oxide, semimetal oxide or oxo salt in the aqueous dispersion of the mixture may vary within wide ranges and may be, for example, 1% to 80%, preferably 25% to 60% or 30% to 50%, by weight, based on the total weight of the aqueous dispersion. Even if a kit of aqueous dispersions is used, the amount of nanoscale particles in the aqueous dispersions of the kit may vary within wide ranges. The amount of nanoscale ZnO particles in the first aqueous dispersion of the kit may be, for example, 1% to 80%, preferably 20% to 70% or 30% to 60%, by weight, based on the total weight of the first aqueous dispersion, and the amount of nanoscale particles of a non-ZnO metal oxide, semimetal oxide or oxo salt in the further aqueous dispersion of the kit may be, for example, 1% to 80%, preferably 5% to 50% or 7.5% to 40%, by weight, based on the total weight of the further dispersion.

The amount of the aqueous dispersion of the mixture or of the kit of aqueous dispersions that is added to the aqueous binder system may vary within broad ranges. The addition is preferably made, however, in amounts such that the mass fraction of the nanoscale ZnO particles and nanoscale particles of a non-ZnO metal oxide, semimetal oxide or oxo salt overall in the dried or cured binder system, more particularly in a coating film, is for example in the range from 0.01% to 20%, preferably 0.1% to 5%, and more preferably 0.15% to 2.5%, by weight.

As mentioned, an individual aqueous dispersion comprising the nanoscale ZnO particles and the nanoscale particles of a non-ZnO metal oxide, semimetal oxide or oxo salt, in other words an aqueous dispersion of the mixture, or a kit of separate aqueous dispersions, can be used. An aqueous dispersion may generally be obtained, for example, by adding water and optionally dispersant or organic solvent to a powder of the nanoscale particles, or is obtained directly from the nanoscale particles production operation.

Preference is given to the use of an individual aqueous dispersion. For preparing the aqueous dispersion of the mixture it is possible, for example, first to provide, separately, aqueous dispersions of the various kinds of nanoscale particles to be used, optionally with use of a suitable dispersant. The aqueous dispersions thus prepared are then mixed in a ratio such as to give an aqueous dispersion having the desired proportion of the various nanoscale particles. For improving the solvent resistance and other properties of a dried or cured binder system which is obtained from an aqueous binder system, the aqueous dispersion of the mixture is added to the aqueous binder system and mixed with it.

In the case of a kit, the first aqueous dispersion comprises the nanoscale ZnO particles and the further aqueous dispersion comprises the nanoscale particles of a non-ZnO metal oxide, semimetal oxide or oxo salt. If a further type of nanoscale particles of a non-ZnO metal oxide, semimetal oxide or oxo salt is used, these particles may be present in the first aqueous dispersion or in the further aqueous dispersion of the kit. They may, however, also be present separately in a third aqueous dispersion of the kit. The aqueous dispersions of the kit are added separately, simultaneously or successively to the aqueous binder system.

The aqueous binder system to which the aqueous dispersion of the mixture or the aqueous dispersions of the kit is or are to be added as an additive may be any customary aqueous binder system known to the skilled person. Water-based binder systems of this kind are available commercially. The binder system is water-based—that is, a substantial part, at least 20% by weight, for example, of the solvent used in the binder system is water. In the aqueous binder system there may be, as and when required, organic solvent present as well, but in general the binder system contains less than 20% by weight, preferably less than 10% by weight, of organic solvents, based on the total weight of the binder system.

The aqueous binder system comprises one or more organic or inorganic binders. These may be any binders customary for aqueous binder systems. Examples of suitable binders are polyesters, polyester acrylates, polyesterurethane acrylates, polyurethanes, including 1-component systems and 2-component systems among others, straight acrylates, acrylate copolymers, including acrylate-styrene copolymers, methyl methacrylate-butyl acrylate copolymers, acrylate-vinyl acetate copolymers, acrylate-polyurethane copolymers (hybrid polymers), acrylate-epoxy copolymers, and aromatic epoxide acrylates, among others, styrene-butadiene copolymers, polybutadienes, latexes, epoxides, polyamides, polyimides, polyolefins, polychloroprene, phenolic resins, ethylene-vinyl acetates, melamine-formaldehyde resins, and silicones. As an aqueous binder system it is possible to use aqueous binder emulsions or binder dispersions of the aforementioned polymers/binders. The aqueous binder systems in question may be, for example, chemically drying systems or, more particularly, physically drying systems.

These known aqueous binder systems can be used in order to form films, or coating films. Alternatively the binder systems are utilized, for example, as adhesives or for sealing. The aqueous binder systems find further application as conventional binders, such as in the textile industry, for example, where aqueous binder systems are employed in applications including the production of what are called nonwovens, e.g. nonwoven fabric. Here, expressed in simplified form, textile fibers are bonded together with a binder system to form a sheetlike textile. Aqueous binder systems are employed in nontextile applications as well, as for example in the case of fiber mats, including rockwool for insulation.

The aqueous binder system may preferably be an aqueous coating material, an aqueous adhesive, an aqueous sealant or an aqueous binder, with an aqueous coating material being preferred. These binder systems may comprise further components in addition to the binder and the solvent, such components being as commonly used in such aqueous binder systems, such as coating materials, adhesives, sealants or binders. The additive in accordance with the present invention may be added to the coating material, adhesive, sealant or binder already comprising all of the desired components. The addition of the additive in accordance with the invention and of the respective optional additional components to the aqueous binder system is arbitrary, however.

Besides the binder and the solvent, the aqueous binder system may comprise further components which are commonly used in binder systems. Examples of such components which are suitable for aqueous binder systems, such as coating materials, adhesives, sealants or binders, for example, more particularly coating materials, are plasticizers, dyes, fillers, pigments, and auxiliaries, such as flow control agents, dryers, antiskinning agents, curing accelerators, wetting agents, and antisettling agents, for example. The aqueous coating material may be transparent or colored, with preference being given to a clear varnish. Equally, however, a pigmented coating material may be used.

The solvent resistance and further properties of the aqueous binder system are improved surprisingly greatly through the addition of the above-described aqueous dispersion of the invention or of the kit of aqueous dispersions. The solvent resistance and the other properties of the aqueous binder system relate to the binder system used as intended and dried or cured, unless indicated otherwise. The aqueous coating materials are suitable for coating substrates of all kinds, the coating being obtained after drying and optionally curing of the coating material applied to the substrate.

As well as improving the solvent resistance, the addition of the aqueous dispersion of the mixture or of the kit of aqueous dispersions to the aqueous binder system has the effect of improving further properties of the binder system, more particularly of the aqueous coating material, such as, for example, improvements in the resistance of the dried or cured system, in the surface properties of the dried or cured system, and in the drying properties of the binder system. Improvements results in terms for example of moisture resistance, adhesion, drying properties, blocking resistance, mechanical stability, gloss retention, water protection index, and weathering resistance of the dried or cured binder system which is obtained from the aqueous binder system by drying and/or curing.

Examples follow for further elucidation of the invention, these examples nevertheless not being intended in any way to restrict the scope of the invention.

EXAMPLES

Working Example 1

For working example 1, mixtures of additives and Worleecryl® 7940 (acrylate copolymer) were prepared, giving a total of 1% by weight of inorganic additives in the dry coating material (see table 1). The solids content of the $SiO_2$ dispersion (prepared from Aerosil® R8200) was 15%, the ZnO dispersion (prepared from ZnO from Microsun, Zinc Oxide P99/30) possessed a solids content of 46%, and the Fe(O)OH dispersion possessed a solids content of 33%. Prior to their mixing, the additives were converted into an aqueous dispersion, using a suitable dispersing additive.

The coating materials with the additives added were homogenized and knife-coated onto glass plates, to give a wet film thickness of approximately 100 µm. The wet films were dried at 70° C. for 3 minutes. The films thus produced on the glass plates were subject in accordance with EN 13523-11 to an MEK resistance test. Table 1 contains the number of double rubs after which the coat on the glass plate had suffered destruction right the way through.

It is seen that the best MEK resistance is achieved with a combination of three additives (#1: ZnO, Aerosil R8200, and Fe(O)OH, Transyellow AC500, Rockwood). The MEK resistance with this coating is better than the weighted average of the resistances of the individual components (samples #2 to #4).

Working Example 2

For working example 2, mixtures of additives and Worleecryl® 7940 (acrylate copolymer) were prepared, giving a total of 1% of inorganic additives in the dry coating material (see table 2). The solids content of the $SiO_2$ dispersion (prepared from Aerosil® 8200) was 15%, the ZnO dispersion (comprising ZnO from Microsun, Zinc Oxide P99/30) possessed a solids content of 46%.

The polymer dispersions with the additives added were homogenized and knife-coated onto glass plates, to give a wet film thickness of 100 µm. The wet films were dried at 70° C. for 3 minutes. The films thus produced on the glass plates were subject in accordance with EN 13523-11 to an MEK resistance test. Table 2 contains the number of double rubs after which the coat on the glass plate had suffered destruction right the way through.

It is seen that the best MEK resistance is achieved with a combination of two additives (Sample #6, ZnO and Aerosil R8200). The MEK resistance with this coating is better than the weighted average of the resistances of the individual components (samples #7 and #8).

TABLE 2

Composition of the coating samples for working example 2

| # | Coating system | Additive 1 | Additive content (mass in dry coat)/% | Additive 2 | Additive content (mass in dry coat)/% | Number of double MEK rubs |
|---|---|---|---|---|---|---|
| 6 | WorleeCryl 7940 | ZnO | 0.97 | $SiO_2$ | 0.03 | 164 |
| 7 | WorleeCryl 7940 | ZnO | 1 | — | — | 108 |
| 8 | WorleeCryl 7940 | — | — | $SiO_2$ | 1 | 35 |
| 9 | WorleeCryl 7940 | — | — | — | — | 60 |

Working Example 3

For working example 3, mixtures of additives and Revertex LS-1032-1 (acrylate polymer dispersion in water) were prepared, giving a total of 1% of inorganic additives in the dry coat (see table 3). As a flow control additive, 6% (m/m, based on the polymer dispersion) of Texanol was added to the dispersion prepared. The solids content of the $SiO_2$ dispersion (Levasil 300/30) was 30%, the ZnO dispersion (comprising ZnO from Microsun, Zinc Oxide P99/30) possessed a solids content of 46%.

The polymer dispersions with the additives added were homogenized and knife-coated onto glass plates, to give a wet film thickness of 100 µm. The wet films were dried at 70° C. for 3 minutes. The films thus produced on the glass plates were subject in accordance with EN 13523-11 to an MEK resistance test. Table 3 contains the number of double rubs after which the coat on the glass plate had suffered destruction right the way through.

It is seen that the best MEK resistance is achieved with a combination of two additives (Sample #10, ZnO and Levasil 300/30). The MEK resistance with this coating is better than the weighted average of the resistances of the individual components (samples #11 and #12).

TABLE 1

Composition of the coating samples for working example 1

| # | Coating system | Additive 1 | Additive content* (%) | Additive 2 | Additive content* (%) | Additive 3 | Additive content* (%) | Number of double MEK rubs |
|---|---|---|---|---|---|---|---|---|
| 1 | WorleeCryl 7940 | ZnO | 0.88 | $SiO_2$ | 0.077 | Fe(O)OH | 0.042 | 443 |
| 2 | WorleeCryl 7940 | ZnO | 1 | — | — | — | — | 108 |
| 3 | WorleeCryl 7940 | — | — | $SiO_2$ | 1 | — | — | 35 |
| 4 | WorleeCryl 7940 | — | — | — | — | Fe(O)OH | 1 | 42 |
| 5 | WorleeCryl 7940 | — | — | — | — | — | — | 60 |

*The additive content refers to the mass in the dry coat (%)
Solids contents of the dispersions: ZnO in water, 46%; Aerosil R8200 in water, 15%; Transyellow in water, 33%

TABLE 3

Composition of the coating samples for working example 3

| # | Coating system | Additive 1 | Additive content (mass in dry coat)/% | Additive 2 | Additive content (mass in dry coat)/% | Number of double MEK rubs |
|---|---|---|---|---|---|---|
| 10 | Revertex LS-1032-1 | ZnO | 0.86 | SiO$_2$ | 0.14 | 120 |
| 11 | Revertex LS-1032-1 | ZnO | 1 | — | — | 68 |
| 12 | Revertex LS-1032-1 | — | — | SiO$_2$ | 1 | 39 |
| 13 | Revertex LS-1032-1 | — | — | — | — | 27 |

Working Example 4

For working example 4, mixtures of additives and an acrylate-based coating formulation (see table 4) were prepared, giving a total of 0.9% of additives in the dry coat (see table 5). The solids content of the SiO$_2$ dispersion (prepared from Aerosil® 8200) was 15%, the ZnO dispersion (comprising ZnO from Microsun, Zinc Oxide P99/30) possessed a solids content of 40%.

As an organic comparative additive, Aquacer® 535 (Byk®) was used, which is likewise used for improving the surface properties. The polymer dispersions with the additives added were homogenized and knife-coated onto glass plates, giving a wet film thickness of 100 μm. The wet films were dried at room temperature. The drying time to drying level 4 was determined in accordance with DIN 53150.

The drying time to drying level 4 (see table 5) is reduced by the use of the aqueous dispersion from more than 48 h to 20 h. The use of Aquacer 535 does not result in a shortening of the time (see table 5, sample 15).

TABLE 4

Composition of the coating formulation "HBST337" used

| Addition step | Ingredient | Amount/g |
|---|---|---|
| 1. | Primal AC-337 ER | 195.00 |
| 2. | Tego Foamex 825 | 0.60 |
| 3. | Water | 30.00 |
| 4. | Texanol | 6.90 |
| 5. | Ammonia solution, 25% | 0.78 |
| 6. | Water | 60.00 |
| 7. | Acrysol RM-12W | 2.01 |
| 8. | Water | 0.30 |

TABLE 5

Composition of the coating material for working example 4

| # | Coating system | Additive 1 | Additive content (mass in dry coat)/% | Additive 2 | Additive content (mass in dry coat)/% | Drying time to drying level 4/h |
|---|---|---|---|---|---|---|
| 14 | HBST337 | ZnO | 0.77 | SiO$_2$ | 0.12 | 20 |
| 15 | HBST337 | Aquacer 535 | 0.9 | — | — | >48 |
| 16 | HBST337 | — | — | — | — | >48 |

The film produced with the aqueous dispersion on the glass plate was also subjected in accordance with EN 13523-11 to an MEK resistance test, and was also compared with coating materials to which only ZnO nanoparticles or SiO$_2$ nanoparticles had been added. Table 6 contains the number of double rubs after which the coat on the glass plate had suffered destruction right the way through.

It is seen that the best MEK resistance is achieved with a combination of two additives (Sample #14, ZnO and SiO$_2$). The MEK resistance with this sample is better than the weighted average of the resistances of the individual components (samples #17 and #18). The use of Aquacer does not result in an improvement in the MEK resistance in "HBST337" (see sample #15).

TABLE 6

Composition of the coating material for working example 4

| # | Coating system | Additive 1 | Additive content (mass in dry coat)/% | Additive 2 | Additive content (mass in dry coat)/% | Number of double MEK rubs |
|---|---|---|---|---|---|---|
| 14 | HBST337 | ZnO | 0.77 | SiO$_2$ | 0.12 | 131 |
| 15 | HBST337 | Aquacer 535 | 0.9 | — | — | 34 |

TABLE 6-continued

Composition of the coating material for working example 4

| # | Coating system | Additive 1 | Additive content (mass in dry coat)/% | Additive 2 | Additive content (mass in dry coat)/% | Number of double MEK rubs |
|---|---|---|---|---|---|---|
| 16 | HBST337 | — | — | — | — | 43 |
| 17 | HBST337 | ZnO | 0.9 | — | — | 107 |
| 18 | HBST337 | — | — | $SiO_2$ | 0.9 | 57 |

All of the working examples show that a combination of zinc oxide and a further nanoparticle in accordance with the invention produces a surprising increase in solvent resistance relative to the use of the individual components. The use of the aqueous dispersion of the mixture or of the kit of the aqueous dispersion also leads to a shortening in the cure time of the binder system by more than half.

What is claimed is:

1. An aqueous dispersion or a kit that comprises at least two aqueous dispersions for improving the resistance and the drying properties of an aqueous binder system, wherein the aqueous dispersion (i) comprises nanoscale ZnO particles and nanoscale particles of at least one non-ZnO metal oxide, semimetal oxide or oxo salt, and wherein the kit (ii) comprises at least two aqueous dispersions comprising a first aqueous dispersion which comprises nanoscale ZnO particles and one or more further aqueous dispersions which comprise nanoscale particles of at least one non-ZnO metal oxide, semimetal oxide or oxo salt, and wherein the nanoscale particles of the at least one non-ZnO metal oxide, semimetal oxide or oxo salt comprise hydrophobic particles and a fraction of the nanoscale particles of at least one non-ZnO metal oxide, semimetal oxide or oxo salt, relative to a total weight of the nanoscale ZnO particles and the nanoscale particles of at least one non-ZnO metal oxide, semimetal oxide or oxo salt, is from 0.5% to 20% by weight.

2. The aqueous dispersion or kit of claim 1, wherein the nanoscale particles of the at least one non-ZnO metal oxide, semimetal oxide or oxo salt comprise one or more of $SiO_2$, aluminum oxide, titanium dioxide, zirconium dioxide, cerium dioxide, yttrium oxide, mixed oxides of aluminum oxide and silicon dioxide, aluminosilicate, iron oxide, and core-shell particles with a shell of $SiO_2$, barium sulfate or calcium carbonate.

3. The aqueous dispersion or kit of claim 1, wherein the aqueous dispersion (i) or further aqueous dispersion of the kit (ii) comprises at least two different nanoscale particles of a non-ZnO metal oxide, semimetal oxide or oxo salt.

4. The kit of claim 1, wherein the kit comprises at least two further aqueous dispersions.

5. The kit of claim 4, wherein one of the at least two further aqueous dispersions comprises nanoscale $SiO_2$ particles and another one of the dispersions comprises nanoscale particles of one or more of aluminum oxide and iron oxide.

6. The aqueous dispersion or kit of claim 1, wherein the hydrophobic particles comprise one or more of hydrophobic $SiO_2$ and hydrophobic $Al_2O_3$.

7. The aqueous dispersion or kit of claim 1, wherein the hydrophobic particles comprise hydrophobic $SiO_2$.

8. The aqueous dispersion or kit of claim 1, wherein the aqueous dispersion (i) or at least one of the aqueous dispersions of kit (ii) comprises at least one dispersant.

9. The aqueous dispersion or kit of claim 1, wherein the fraction of the nanoscale particles of at least one non-ZnO metal oxide, semimetal oxide or oxo salt, relative to the total weight of the nanoscale ZnO particles and the nanoscale particles of at least one non-ZnO metal oxide, semimetal oxide or oxo salt, is from 2% to 15% by weight.

10. A method of increasing the solvent resistance of a dried or cured aqueous binder system, wherein the method comprises combining the aqueous binder system with the aqueous dispersion (i) or kit (ii) of claim 1.

11. The method of claim 10, wherein the aqueous binder system is an aqueous coating material, an aqueous adhesive, an aqueous sealant, or an aqueous binder.

12. The method of claim 10, wherein (i) or (ii) are employed in an amount to result in a combined mass fraction of the nanoscale ZnO particles and the nanoscale particles of at least one non-ZnO metal oxide, semimetal oxide or oxo salt in the dried or cured binder system of from 0.01% to 20% by weight.

13. The method of claim 12, wherein the combined mass fraction is from 0.1% to 5% by weight.

14. The method of claim 10, wherein a fraction of the nanoscale particles of the at least one non-ZnO metal oxide, semimetal oxide or oxo salt, relative to a total weight of the nanoscale ZnO particles and nanoscale particles of the at least one non-ZnO metal oxide, semimetal oxide or oxo salt, is from 2% to 15% by weight.

15. An aqueous dispersion or a kit that comprises at least two aqueous dispersions for improving the resistance and the drying properties of an aqueous binder system, wherein the aqueous dispersion (i) comprises nanoscale ZnO particles and nanoscale particles of at least one non-ZnO metal oxide, semimetal oxide or oxo salt, and wherein the kit (ii) comprises at least two aqueous dispersions comprising a first aqueous dispersion which comprises nanoscale ZnO particles and one or more further aqueous dispersions which comprise nanoscale particles of at least one non-ZnO metal oxide, semimetal oxide or oxo salt, a fraction of the nanoscale particles of at least one non-ZnO metal oxide, semimetal oxide or oxo salt, relative to a total weight of the nanoscale ZnO particles and the nanoscale particles of at least one non-ZnO metal oxide, semimetal oxide or oxo salt being from 0.5% to 20% by weight.

16. The aqueous dispersion or kit of claim 15, wherein the fraction of the nanoscale particles of at least one non-ZnO metal oxide, semimetal oxide or oxo salt, relative to the total weight of the nanoscale ZnO particles and the nanoscale particles of at least one non-ZnO metal oxide, semimetal oxide or oxo salt, is from 2% to 15% by weight.

17. A method of increasing the solvent resistance of a dried or cured aqueous binder system, wherein the method comprises combining the aqueous binder system with the aqueous dispersion (i) or kit (ii) of claim 15.

18. The aqueous dispersion or kit of claim 15, wherein the nanoscale particles of the at least one non-ZnO metal oxide, semimetal oxide or oxo salt comprise one or more of $SiO_2$, aluminum oxide, titanium dioxide, zirconium dioxide, cerium dioxide, yttrium oxide, mixed oxides of aluminum oxide and silicon dioxide, aluminosilicate, iron oxide, and core-shell particles with a shell of $SiO_2$, barium sulfate or calcium carbonate.

19. The aqueous dispersion or kit of claim 15, wherein the aqueous dispersion (i) or further aqueous dispersion of the kit (ii) comprises at least two different nanoscale particles of a non-ZnO metal oxide, semimetal oxide or oxo salt.

20. The aqueous dispersion or kit of claim 15, wherein the aqueous dispersion (i) or at least one of the aqueous dispersions of kit (ii) comprises at least one dispersant.

* * * * *